United States Patent
Eerola et al.

[19]

[11] Patent Number: 5,821,898
[45] Date of Patent: Oct. 13, 1998

[54] CODELESS GPS POSITIONING METHOD AND APPARATUS FOR SUCH CODELESS POSITIONING

[75] Inventors: Ville Eerola; Tapani Ritoniemi; Timo Husu; Marko Kyrölä, all of Tampere; Kim Kaisti; Timo Saarnimo, both of Helsinki; Vesa Karttunen, Espoo; Jukka Mäkelä, Helsinki, all of Finland

[73] Assignee: Vaisala Oy, Helsinki, Finland

[21] Appl. No.: 614,477

[22] Filed: Mar. 13, 1996

[30] Foreign Application Priority Data

Mar. 13, 1995 [FI] Finland ..................................... 951147

[51] Int. Cl.⁶ ........................................................ G01S 5/02
[52] U.S. Cl. ................................................................ 342/357
[58] Field of Search ................................................ 342/357

[56] References Cited

U.S. PATENT DOCUMENTS

| | | |
|---|---|---|
| 4,622,557 | 11/1986 | Westerfield ............................. 342/357 |
| 4,754,283 | 6/1988 | Fowler ..................................... 342/461 |
| 5,119,102 | 6/1992 | Barnard ................................... 342/357 |
| 5,119,504 | 6/1992 | Durboraw, III . | 
| 5,223,843 | 6/1993 | Hutchinson . |
| 5,379,224 | 1/1995 | Brown et al. ........................... 342/357 |
| 5,402,442 | 3/1995 | Ishigaki .................................. 342/357 |
| 5,420,592 | 5/1995 | Johnson ................................. 342/357 |
| 5,594,454 | 1/1997 | Devereux et al. ...................... 342/357 |

*Primary Examiner*—Gregory C. Issing

[57] ABSTRACT

The invention relates to a method and an apparatus for codeless GPS positioning. According to the method, the unit (2) to be positioned receives GPS signals from several satellites (4), the codes of the GPS signals are removed, and the extracted carrier signals are transmitted out from the unit (2) to be positioned for the purpose of determining the position and/or velocity of said unit (2) to be positioned. According to the invention, the carrier signal frequencies are detected by means of a phase-locked loop and the thus detected signals are transmitted in digital format out from the unit (2) to be positioned for the purpose of further processing.

14 Claims, 7 Drawing Sheets

CODELESS GPS POSITIONING METHOD AND APPARATUS FOR SUCH CODELESS POSITIONING

The present invention relates to a method for positioning based on codeless GPS signals.

The invention also concerns an apparatus for such codeless GPS positioning.

The satellite navigation system GPS (Global Positioning System) is based on processing navigation message data signals sent by 24 satellites circulating the earth. The most conventional method of utilizing said positioning system is to use the coded GPS signal, whereby the position-resolving device demodulates the codes of navigation messages from at least four satellites thus determining the accurate position of the device by combining the coded information sent by each of the satellites with accurate time information. While such an arrangement is accurate and efficient, it is not suitable for use in products based on low unit prices such as disposable radiosondes or consumer electronics. Extraction of the position code requires a lot of computational power thus making the positioning device costly and complicated.

Also known in the art is a method referred to as the codeless positioning method, in which the phase shift keyed GPS signal is squared to derive noise-embedded sine-wave GPS signals, whose frequency is shifted due to Doppler shift related to the position of the sending satellite. As the orbital position parameters of the satellites are known, the position of the receiving device can be determined from the frequencies of the received satellite signals. A problem hampering the codeless positioning method is that the signal-to-noise ratio of received satellite signals is very low, and additionally, position determination from the Doppler-shifted signals by computational methods is a relatively complicated task. In some conventional radiosonde embodiments, such a squared noisy signal is sent unprocessed to the ground station. This approach requires a wideband transmission channel, and yet, the signal is extremely vulnerable to disturbance due to its low signal-to-noise ratio.

It is an object of the present invention to overcome the disadvantages of the above-described techniques and to provide an entirely novel type of codeless GPS-based positioning method and apparatus.

The goal of the invention is achieved by demodulating the Doppler-shifted satellite signals with the help of a phase-locked loop already in the positioning device and then sending the demodulated signals in digital format to further processing.

More specifically, the method according to the invention is characterized by carrier signal frequencies detected by means of a phase-locked loop and transmitted in digital format for further processing.

Furthermore, the apparatus according to the invention is characterized by a phase-locked loop for converting demodulated signals into frequencies expressed in digital format for transmission to further processing.

The invention offers significant benefits.

The embodiment according to the invention offers an effective method of deriving the Doppler-shifted frequencies from GPS signals even when embedded in heavy noise. The digitized frequency information can be sent in a reliable manner over a narrow-bandwidth channel to further processing. Such properties are particularly advantageous in conjunction with radiosonde systems, wherein the electronics of the radiosonde itself can be made both extremely cost-efficient to produce and lightweight. An advantageous application of the arrangement according to the invention is also found in consumer electronics devices, whereby the overall price level of GPS locators will come down.

In the following the invention will be examined in greater detail with reference to exemplifying embodiments illustrated in the appended drawings, in which.

The positioning system according to the invention is intended for use in apparatuses in which cost, power consumption or weight factors do not favor the placement of the computational means for position determination in the GPS signal receiving device itself, but rather the signal is sent forward for further processing at a separate ground or base station. The apparatus according to the invention is particularly advantageously used in the velocity determination of radiosondes. Here, the radiosonde position information is obtained when required by integrating the velocity information.

Figure 1A:
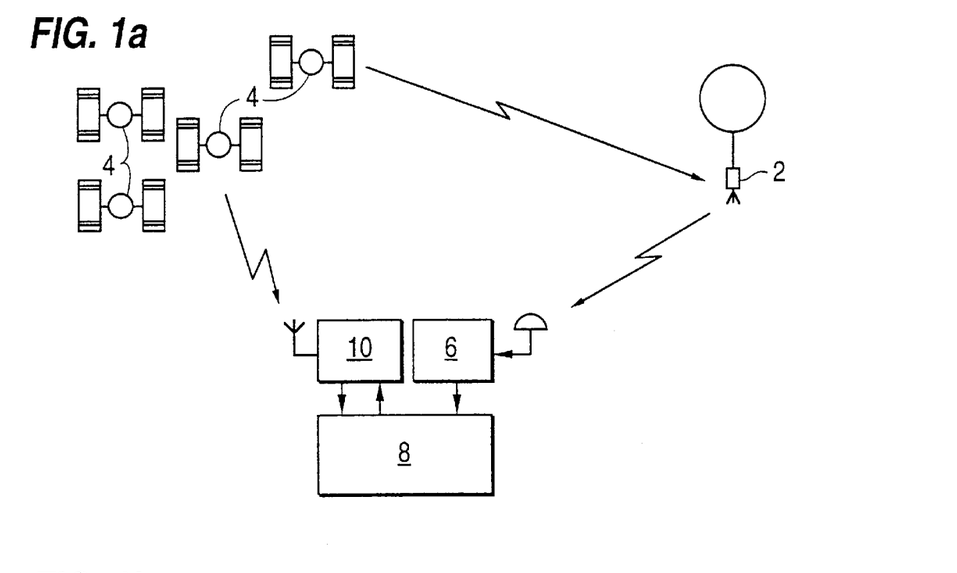
FIG. 1a is a block diagram of an embodiment according to the invention applied to a radiosonde system.

Referring to FIG. 1a, the unit such as a radiosonde 2 to be tracked in a radiosonde application receives the signals of at least four GPS satellites 4. According to the invention, the radiosonde electronics performs removal of the GPS code and extraction of the satellite carrier frequencies, which are Doppler-shifted due to the movements of the satellites. The carrier frequencies are sent in digital format to a radio receiver 6, where the demodulated signal is further taken to a computing block 8 performing the differential positioning and velocity computations. As the computing block 8 additionally admits the satellite position parameters received from the satellites 4 and demodulated in a code-tracking receiver 10, the output of the computing block can provide both velocity and position vector information on the moving unit to be tracked such as the radiosonde 2 in the present case. The radiosonde 2 as well as other possible objects suited for position tracking according to the invention, e.g., waterborne, land and airborne vehicles, are later in the text generally referred to as units to be positioned.

Figure 1B:
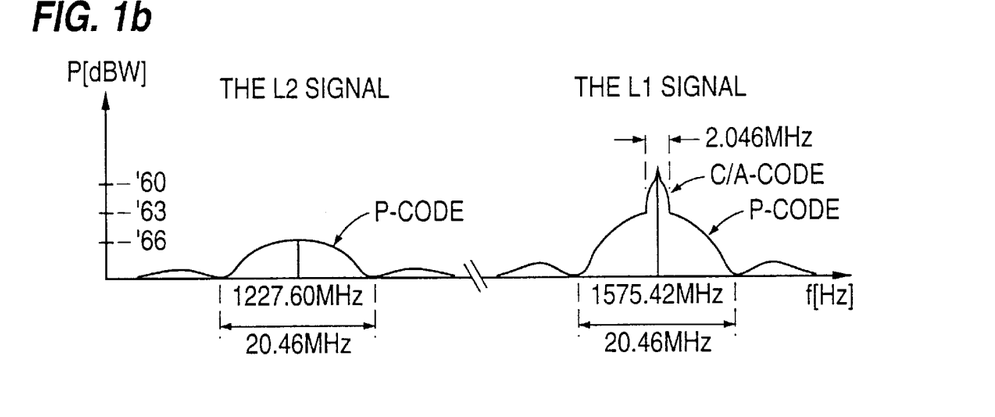
FIG. 1b is a graph showing the spectrum of a GPS signal.

Referring to FIG. 1b, the GPS signal comprises two microwave-band signals L2 and L1, of which the signal of higher importance to the invention is the L1 signal containing the C/A code. In the L1 signal, the bandwidth of the carrier modulated with the C/A code is 2.046 MHz at a center frequency of 1575.42 MHz. The signal is modulated using phase shift keying, and according to the invention, this modulation is removed whereby sinewave carrier signals are derived at frequencies shifted by Doppler shifts utilizing either a squaring circuit shown in FIG. 2, or alternatively, a Costas loop shown in FIG. 3.

Figure 2:
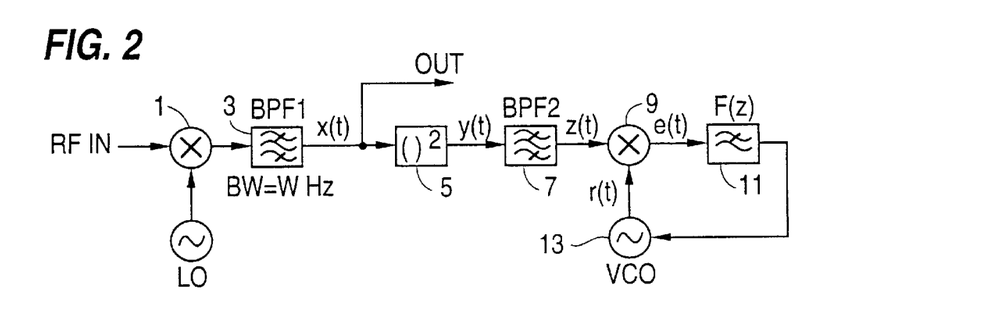
FIG. 2 is a block diagram of the squaring loop.

Referring to FIG. 2, the squaring circuit shown therein utilizes a multiplier 1 for suitably converting the GPS signal to a lower frequency and then performs low-pass filtration in a filter 3. Next, the GPS code of the signal is removed by squaring the signal in a squaring circuit 5 and subsequently taking the signal through a bandpass filter 7 to eliminate the low-pass or zero-frequency components thus further narrowing the signal bandwidth in order to improve the signal-to-noise ratio. At the output of the bandpass filter, the carrier of the GPS signal is available extracted free from the code. The signal may now be taken to a phase-locked loop comprising a phase detector 9, a loop filter 11 and a voltage-controlled oscillator 13.

Figure 3:
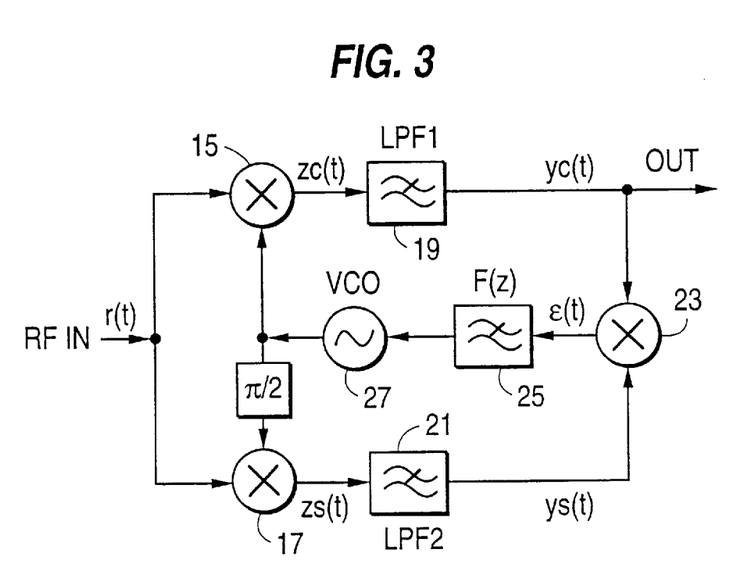
FIG. 3 is a block diagram of the Costas loop basic configuration.

Referring to FIG. 3, the circuit shown therein is an alternative method of removing the code of the GPS signal and thereby extracting the carrier of the signal. This circuit is known as the Costas loop, or also the I/Q detector. The circuit comprises two separate branches each formed by multiplier circuits 15 and 17 followed by low-pass filters 19 and 21. The outputs of the low-pass filters are multiplied with each other in a multiplier 23, the signal is next low-pass filtered in a filter 25, after which the signal is taken to a voltage-controlled oscillator 27, whose output in turn is further taken to the multiplier circuits 15 and 17 so that the signal taken to the lower branch circuit 17 is phase-shifted by $\pi/2$. In the configuration of FIG. 3, the circuit tends to lock on a single modulated carrier taken to its input thus acting as a phase-locked loop. The locally synthesized version of the incoming carrier is obtained from the output of the voltage-controlled oscillator 27.

Figure 4:
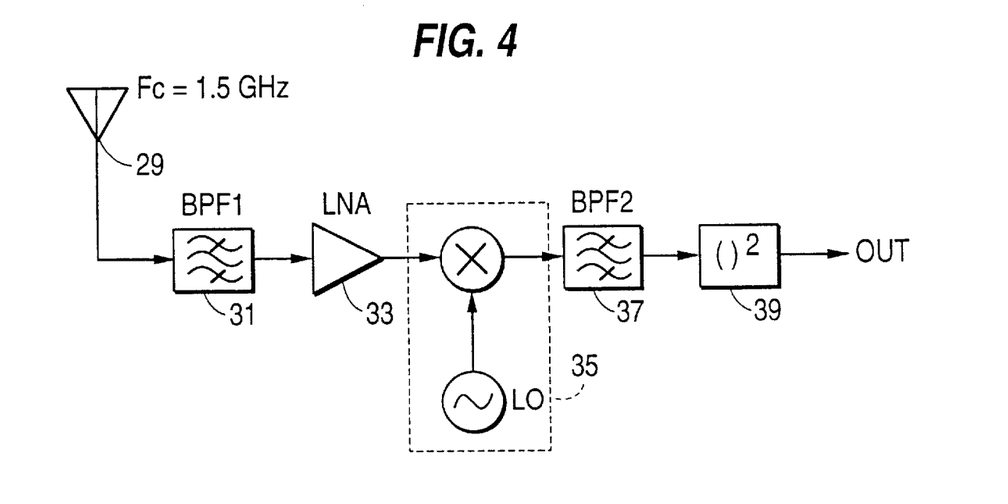
FIG. 4 is a schematic block diagram of a front end for a GPS receiver equipped with a squaring detector.

Referring to FIG. 4, the front end of a GPS receiver equipped with a squaring circuit is therein shown on the level of a schematic block diagram. The input signal at approx. 1.5 GHz is received with the help of an antenna 29 and bandpass-filtered in a filter 31. The bandpass filter 31 is necessary to reduce the noise power and attenuate signals at the image frequency. The signal is amplified by a preamplifier 33 prior to down-converting it by a mixer 35. Next, the signal is filtered in a second bandpass filter 37 serving for two functions. First, the filter removes undesirable frequency products of the mixer, and second, reduces the noise power entering the squaring circuit 39. The bandwidth of the bandpass filter 37 should be as narrow as possible to minimize the noise power. On the other hand, the bandwidth should be sufficiently wide to pass the full spectrum of the BPSK signals with relatively small distortion.

Figure 5:
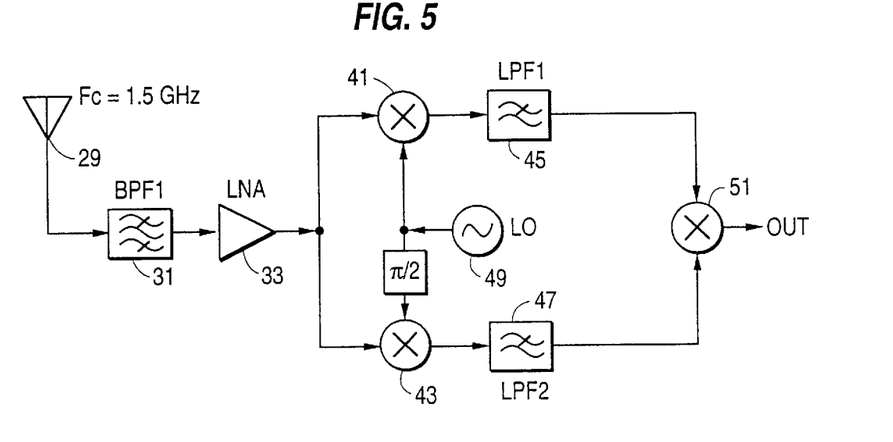
FIG. 5 is a block diagram of a front end for a GPS receiver equipped with an I/Q detector.

Referring to FIG. 5, the GPS receiver implemented with an I/Q detector shown therein is identical up to the preamplifier 33 with the configuration shown in FIG. 4. Thereafter, the signal path is divided into two branches, both of them incorporating multipliers 41 and 43 followed by low-pass filters 45 and 47, respectively. The second input signal for the multiplier circuits 41 and 43 is obtained from an oscillator 49, whereby the oscillator signal is taken to the lower signal-processing branch phase-shifted by $\pi/2$. The function of the filters 45 and 47 is to remove the frequency products of the mixer output signal at approximately twice the input radio-frequency signal. The low-pass filters should pass the bandwidth of the modulation signal relatively unchanged, which means that their optimum bandwidth is close to the modulation bandwidth. As the signal spectra are now of the low-pass type, the optimal bandwidth for the GPS C/A code is approx. 1 MHz. After filtration, the signals are multiplied with each other in a multiplier 51, whereby the modulation signal components (that is, modulated code components) are removed. Although the I/Q-type receiver requires a greater number of circuit components, it is an attractive alternative as its filters are of the low-pass type, and thus, easy to implement. In comparing the above-described I/Q type codeless receiver with the Costas-loop-type receiver shown in FIG. 3, it can be seen that the largest difference between the two circuits is the feedback path which is omitted from the circuit of FIG. 5 and is replaced by a fixed-frequency local oscillator 49. Because the embodiment according to the invention is based on Doppler shift frequencies, that is, differences between the nominal carrier frequency and the actual center frequency of the carrier, it will be possible to use the error signal of the Costas loop as the measured variable if the local oscillator frequency is deviated by a small amount from the nominal frequency. The Doppler shifts may be positive or negative depending on the relative velocity of the satellite with respect to the receiver antenna. Should the local oscillator frequency coincide with the nominal carrier frequency, the difference frequencies would be either negative or positive. However, since only the magnitude of the difference frequency can be measured, it is mandatory to detune the local oscillator frequency from the nominal carrier frequency by an amount reaching the maximum likely value of the Doppler shift in order to keep the difference frequencies positive at all times. In the selection of the frequency difference of detuning, it must be noted that the error signal in the Costas loop corresponds to double the detuning frequency difference. Therefore, the detuning difference must be selected to be at least double the maximum likely value of the Doppler shift. The circuit configuration according to the invention provides both of the above-described alternative methods of code removal. Hence, the circuit may be operated in either the squaring or the I/Q mode. The circuit has an analog input which is sampled and converted into digital format using a 1-bit A/D converter, that is, a comparator.

Figure 6:
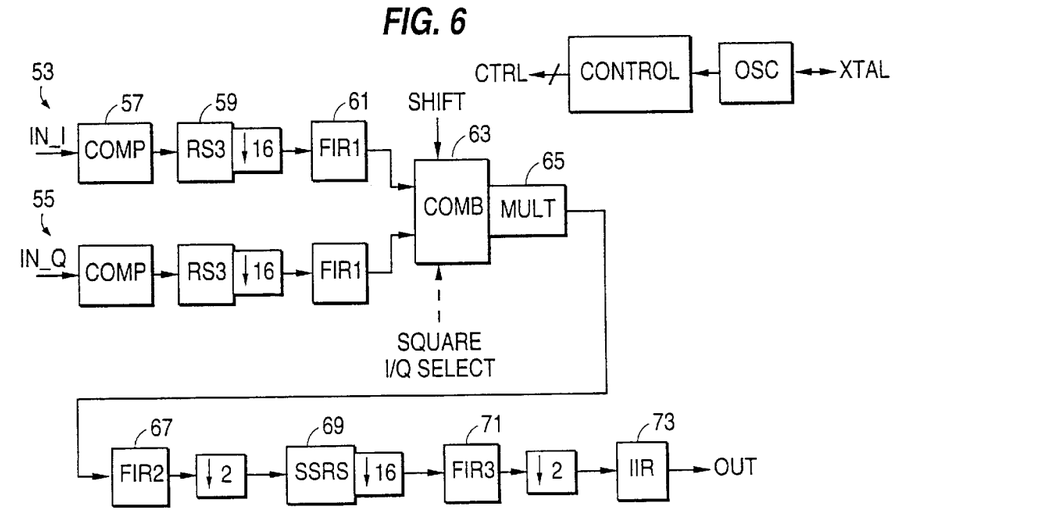
FIG. 6 is a detailed block diagram of a front end circuitry for a receiver according to the invention.

Referring to FIG. 6, the circuit operated in the I/Q mode comprises two branches, the I-branch 53 and the Q-branch 55. The analog input signal is first taken in either branch to a comparator 57 that samples the signal using a sampling rate of 51.2 MHz and converts the signal into 1-bit digital format. The digital data stream is filtered and decimated in a first filter 59 of the running sum type which is a third-order filter performing decimation by a factor of 16. After decimation the data is filtered with the help of an FIR (Finite Impulse Response) filter 61 performing as a low-pass filter that limits the signal bandwidth to 1 MHz maximum. Next to the filtration, the two data streams (I and Q) are taken to a combining circuit 63. The combining circuit 63 can select between two operating modes of the circuit. The function of the combining circuit 63 is such that in the I/Q mode the circuit permits the signals of both branches to reach a multiplier 65, while in the squaring mode only the I-branch 53 can provide an input signal to the multiplier 65. After the squaring of the data, which occurs at a sampling rate of 3.2 MHz, the data is filtered and further decimated in an FIR-2 filter 67, in a serial-format fourth-order running sum (RS) filter 69 and in an FIR-3 filter 71. This section of the circuitry decimates the signal by number 64, whereby the total decimation of the signal on the data path of the receiver front end will occur by number 1024. Hence, the final sampling rate will be exactly 50 kHz. After the low-pass filter 71 is connected an IIR-type high-pass filter 73 serving to remove the DC components of the signal caused by the squaring or comparator circuits. As the high-pass cutoff frequency of the IIR filter 73 is set at about 500 Hz, the available signal bandwidth at the receiver front end is approx. 24 kHz. The Q-branch 55 may be entirely omitted from the circuit if the circuit is to be used in the squaring mode only.

Figure 7:
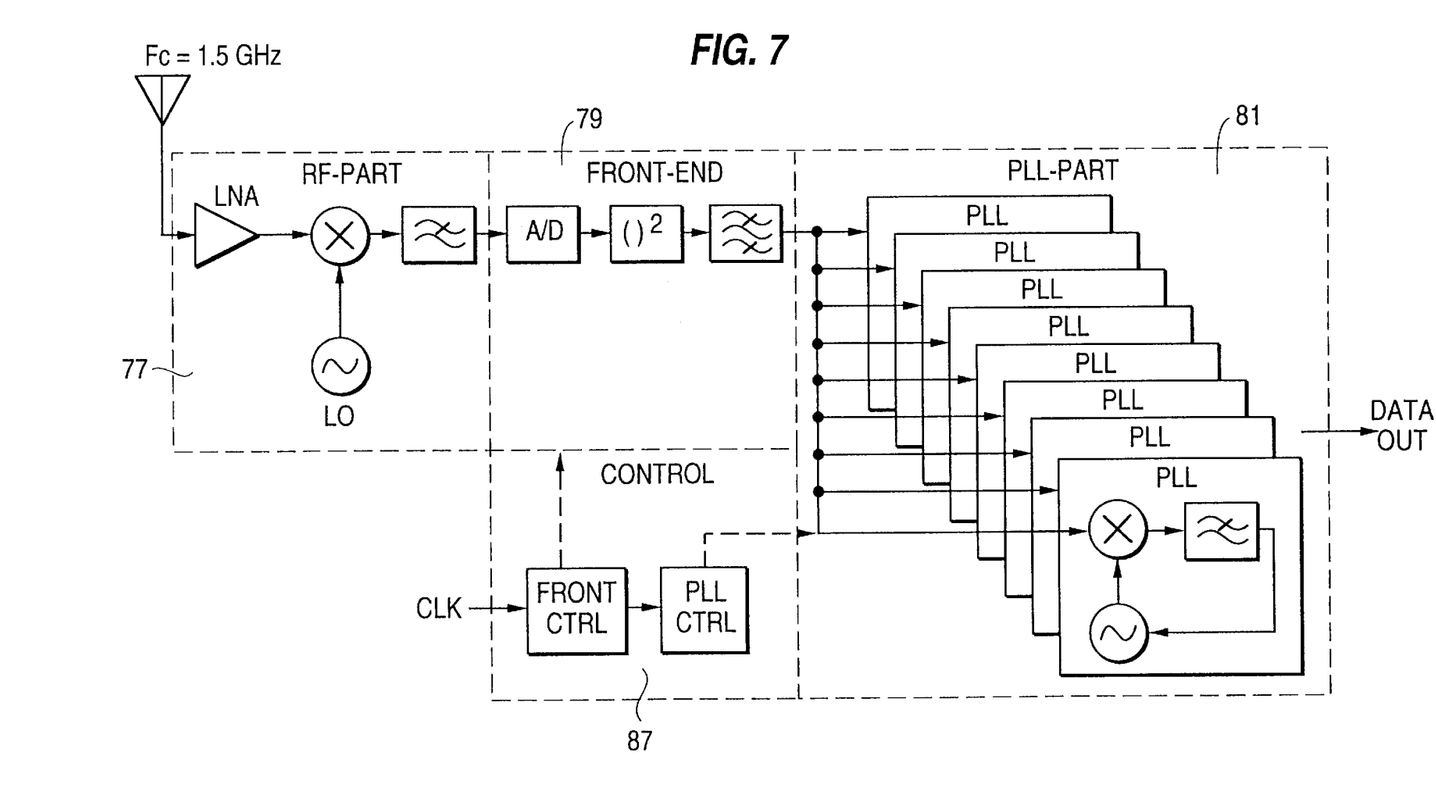
FIG. 7 is a schematic block diagram of a codeless GPS receiver according to the invention.

Referring to FIG. 7, a schematic block diagram of the apparatus according to the invention is shown therein based on removal of the GPS code by the squaring method. As illustrated in the diagram, the signal is preamplified in the radio-frequency block 77 and the signal is converted to a lower frequency range and additionally the signal is low-pass filtered. In the front-end block 79 the signal is digitized, squared and bandpass filtered, after which filtration the signal is detected by phase-locked circuits in the section 81. The entire system is controlled by a control block 86.

Figure 8:
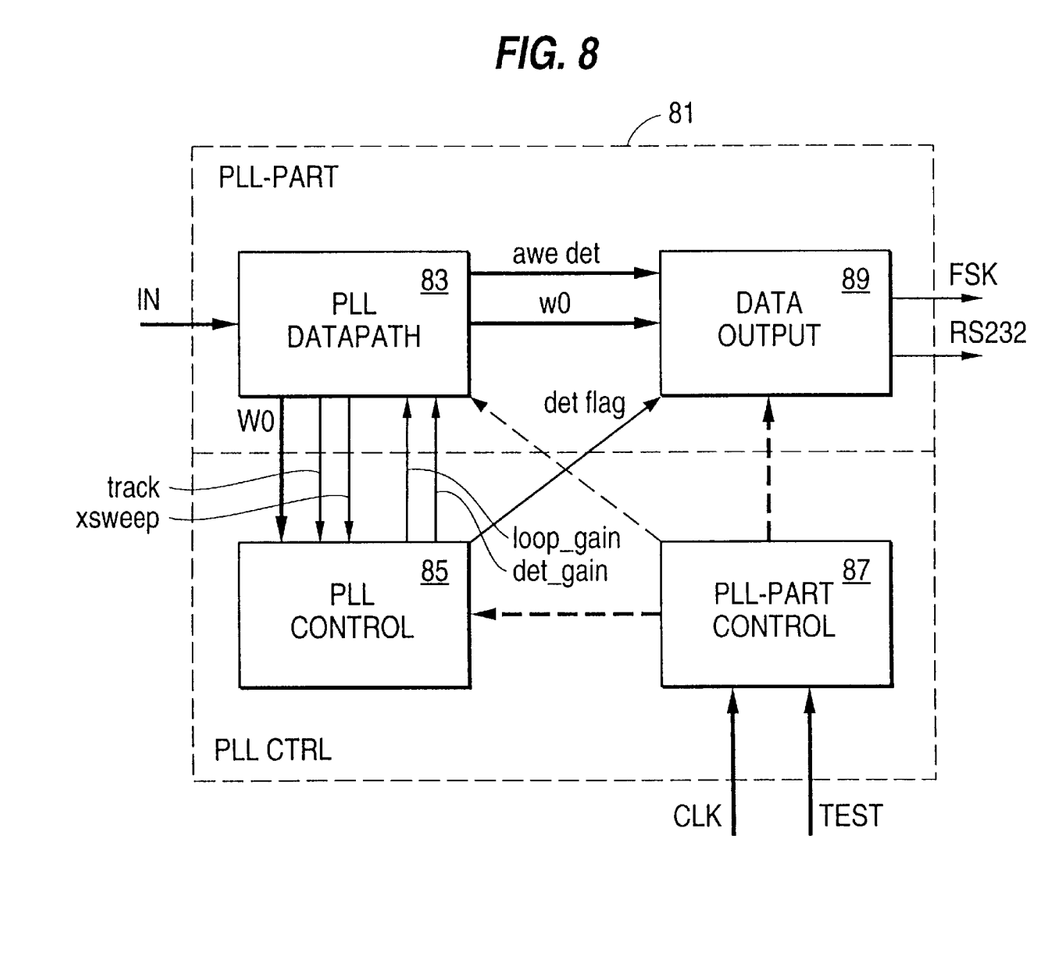
FIG. 8 is a detailed block diagram of the phase-locked loop section of the receiver shown in FIG. 7.

Referring to FIG. 8, a more detailed diagram of section 81 of FIG. 7 is shown. The eight-channel phase-locked loop section 81 forms the nucleus of the receiver and it is capable of searching the Doppler-shifted carrier frequencies of eight satellites simultaneously. While the logical implementation of the phase-locked loop block 81 provides eight individual phase-locked channels, the physical realization of its phase-locked circuits is implemented by combining a time-multiplexed data path 83 having separate state variables for eight channels with a control block 85, which provides the necessary identification and tracking functions. A common control block 87 provides circuit control signals for the phase locked data path 83 of the phase-locked loop section and an output block 89 serves to collect the data for further transmission to a ground station, whereby the data is sent either as a binary data stream in the RS-232 format or as an FSK-modulated analog signal.

Figure 9:
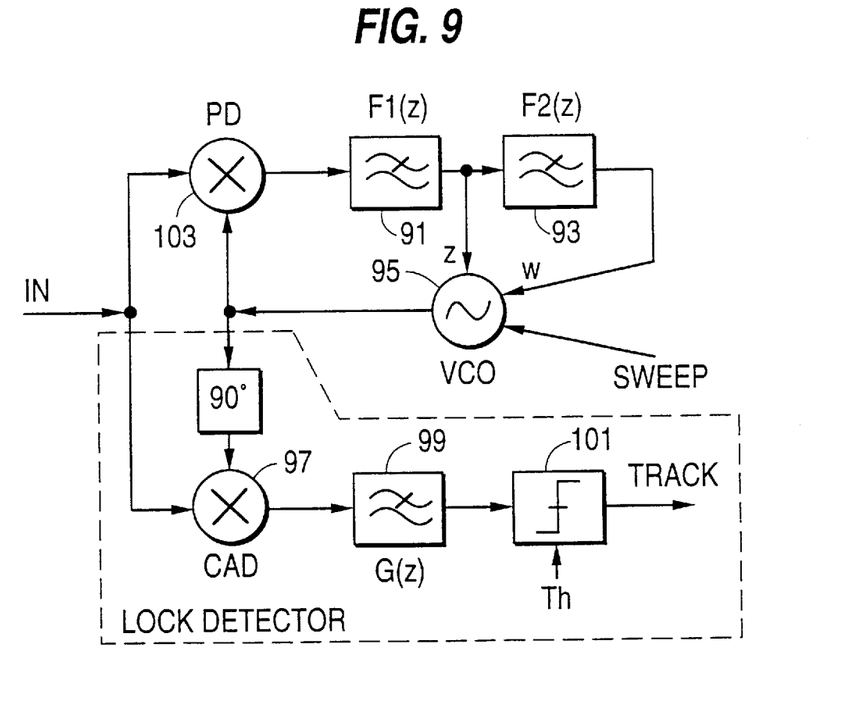
FIG. 9 is a block diagram of a phase-locked loop according to the invention.

Referring to FIG. 9, the phase-locked loop shown therein incorporates two separate filters 91 and 93. Actually, the circuit corresponds to a fourth-order phase-locked loop. The third integrator of the loop is included in a voltage-controlled oscillator 95, which represents an additional center frequency control facility with respect to conventional VCO configurations. The phase-locked loop may be considered to include two parts. Of these, the control loop of short time constant tends to follow the phase of the incoming signal, and this control loop comprises a first-order filter 91 and a voltage-controlled oscillator 95 for the phase control of the first integrator. In fact, this kind of a circuit configuration would be sufficient for constant frequency tracking. In principle a second-order loop can follow incoming signals even in the case that a constant deviation of the frequency prevails, but with the risk of loss of lock, because such an excursion of the loop away from its natural frequency, that is, off from the center frequency of the voltage-controlled oscillator, pushes the loop to its limits causing the loop to slip easily out from phase lock. The situation is even worse when the input signal frequency is not constant as is the case with the GPS signals, whereby a frequency excursion readily forces the phase-locked loop to slip out from its relatively narrow range of phase-locking. Hence, the center frequency of the phase-locked loop must be additionally controlled. The second, outer control loop comprising a latter low-pass filter 93 and a second integrator of the VCO 95 serves with the help of a longer time constant to keep the center frequency of the phase-locked loop tracking the frequency of the satellite signal. The outer control loop makes the phase-locked loop to act as a fourth-order control loop. If the tracking of the satellite signal is lost, the output signal of the phase detector 103 will be broadband noise having an essentially zero mean value, whereby the value of the loop control signal after the filters 91 and 93 will be zero. As the integrators of the VCO 95 are ideal, they will keep the center frequency of the VCO unchanged, and thus, if the loss of the satellite signal is only temporary, the phase-locked situation will be restored in a while at a high probability. Particularly in radiosonde applications, such a temporary loss of phase-lock is typical due to the high noise level and wobbling of the radiosonde. With reference to FIG. 9, the phase-locked circuit comprises a phase-coherent amplitude detector 97 and a low-pass filter 99 as well as a comparator 101. The reference signal of the coherent amplitude detector 97 is phase-shifted by 90° from the signal phase of the phase detector 103, which maximizes the signal level of the phase-locked signal in the circuit 97 while simultaneously minimizing the output signal level of the phase detector 103. The comparator 101 has an adjustable threshold providing a hysteresis function for noisy signals.

Figure 10:
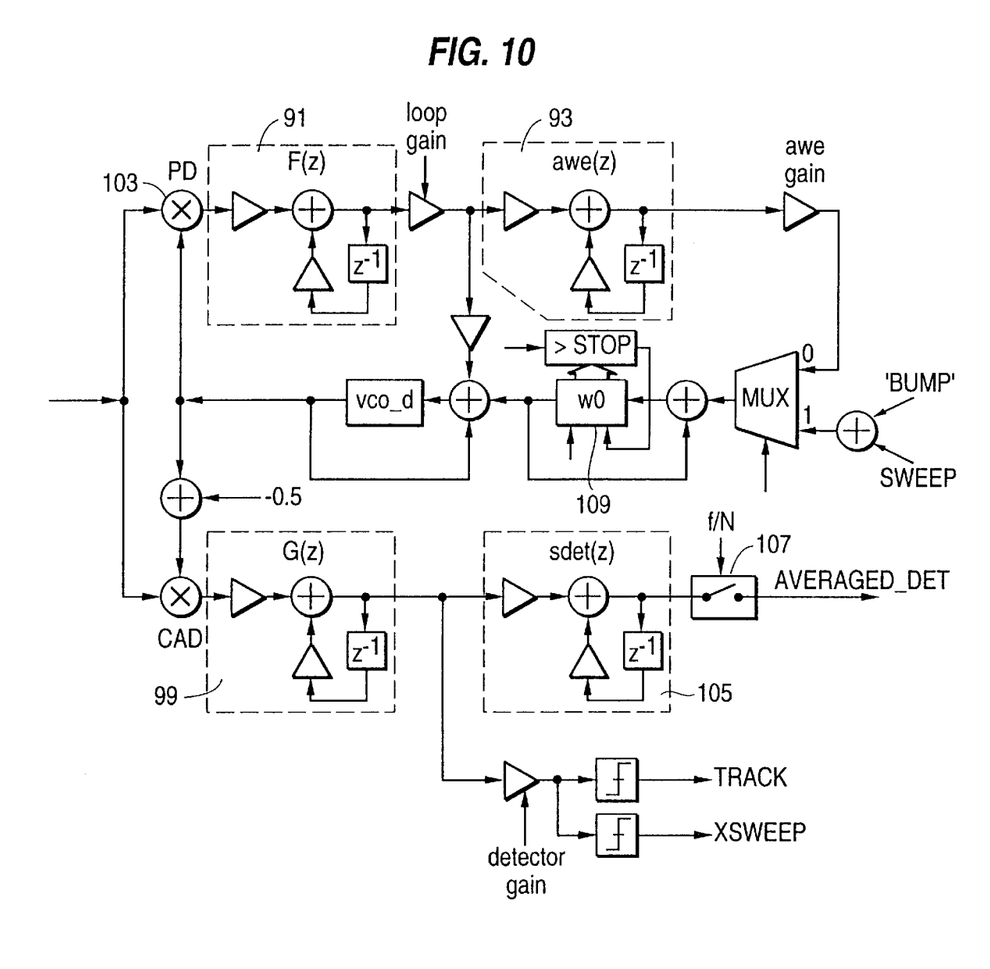
FIG. 10 is a detailed block diagram of the circuit shown in FIG. 9.

Referring to FIG. 10, the schematic block diagram of FIG. 9 is elaborated in greater detail. The value w0 of the register 109 is the center frequency and the output signal, labelled averaged_det for 'average detected counter value,' of the block 107 is a sampled amplitude value, low-pass filtered in low-pass filter 105, representing the level of the satellite signal. The control of the circuit configuration shown in FIG. 10, that is, block 85 of FIG. 8, can be divided into three functionally different groups. The control scheme is implemented by programming means.

The first control task of the circuit is to lock on the 4 first acquired satellites as quickly as possible. This is accomplished by controlling the loop bandwidth so that in the locked state of the circuit the bandwidth is kept as narrow as possible in order to minimize the noise level of the signal, while in the sweeping state the bandwidth can be widened to permit faster sweep.

Secondly, the phase-locked loop is controlled using a tracking algorithm capable of monitoring the signal levels of acquired satellites as well as decision-making on the eventual loss of an acquired satellite signal followed by initiation of signal reacquisition. Due to the low signal-to-noise level of the satellite signal, it is imperative for the function of the algorithm that such signal reacquisition is not started prematurely, but rather only after the fulfillment of certain criteria indicating a real loss of the satellite signal. For this purpose, the algorithm uses time counters.

Thirdly, using programming means the different channels of the phase-locked loop block are forced to track different satellites. Without such a control it would be plausible that all channels could lock tracking only a few satellites with the strongest signals.

According to the invention, the data containing the Doppler-shifted frequencies is typically transferred to further processing at a rate of 1200 bit/s using 10-bit synchronous format containing one start bit, eight data bits and one stop bit.

Although the present invention is most suited for position tracking and velocity measurement of radiosondes, it can as well be applied to position finding of vehicles and also used in conjunction with portable positioning devices, whose market has opened recently.

Notwithstanding the use of digital techniques as shown in FIG. 6 for removing the code of a GPS signal, analog techniques may equally well be used within the scope of the invention for such code removal.

The entire receiver according to the invention excluding the RF part can be made on a single integrated circuit. A suitable manufacturing technique is the 0.8 $\mu$m CMOS process, for instance.

We claim:

1. A codeless GPS positioning method, in which method a unit to be positioned receives GPS signals from several satellites, BPSK modulated codes of the GPS signals are removed, and detected and measured carrier frequencies of the satellites are transmitted from the unit for the purpose of determining the position and/or velocity of said unit to be positioned, wherein the carrier signal frequencies are detected by digitizing the GPS signals before the codes are removed, and processing the digitized signals through a phase-locked loop, and the thus detected signals are transmitted in digital format from the unit for further processing, wherein the phase-locked loop includes a fourth-order phase-locked loop.

2. A method as defined in claim 1, wherein digital signal squaring is used for the step of removing codes from the GPS signal.

3. A method as defined in claim 2, further comprising the step of computing the position of said unit from sequential velocity information.

4. A method as defined in claim 1, wherein digital I/Q signal processing is used for the step of removing codes from the GPS signal.

5. A method as defined in claim 4, further comprising the step of computing the position of said unit from sequential velocity information.

6. A method as defined in claim 1, further comprising the step of computing the position of said unit from sequential velocity information.

7. A method as defined in claim 1, further comprising the step of computing the position of said unit from sequential velocity information.

8. An apparatus for codeless GPS positioning mounted in a unit to be positioned, said apparatus comprising:

means for receiving GPS signals from a plurality of different satellites;

filtration and amplifying means for filtering and amplifying the received signals;

mixer means for down-converting the frequencies of the filtered and amplified signals;

analog/digital converter for converting the down-converted signals into digital format;

code removal means for removing BPSK modulated codes from a GPS signal digitized by said analog/digital converter;

means for transmitting a signal from said unit for the determination of position and/or velocity of said unit; and a phase-locked loop for detecting and measuring, from signals output by said code removal means, carrier frequencies of the satellites expressed in digital format for transmission by said means for transmitting to further processing, wherein said phase-locked loop includes a fourth-order phase-locked loop.

9. An apparatus as defined in claim 8, wherein said code removal means is a squaring-type of code removing means.

10. An apparatus as defined in claim 9, wherein said A/D converter is a one-bit comparator.

11. An apparatus as defined in claim 8, wherein said code removal means is an I/Q-branching-type of code removing means.

12. An apparatus as defined in claim 11, wherein said A/D converter is a one-bit comparator.

13. An apparatus as defined in claim 8, wherein said A/D converter is a one-bit comparator.

14. An apparatus as defined in claim 8, wherein said A/D converter is a one-bit comparator.

* * * * *